United States Patent
Patiño Martinez et al.

(10) Patent No.: US 9,816,155 B2
(45) Date of Patent: Nov. 14, 2017

(54) HEAP LEACHING METHOD

(71) Applicant: BHP Chile Inc., Santiago (CL)

(72) Inventors: Eduardo Luis Patiño Martinez, Santiago (CL); Michael James Nicol, Mt. Pleasant (AU); George Frederick Rautenbach, Santiago (CL)

(73) Assignee: BHP CHILE INC., Santiago (CL)

( * ) Notice: Subject to any disclaimer, the term of this patent is extended or adjusted under 35 U.S.C. 154(b) by 184 days.

(21) Appl. No.: 14/422,910

(22) PCT Filed: Aug. 21, 2013

(86) PCT No.: PCT/IB2013/001810
§ 371 (c)(1),
(2) Date: Feb. 20, 2015

(87) PCT Pub. No.: WO2014/030048
PCT Pub. Date: Feb. 27, 2014

(65) Prior Publication Data
US 2015/0232963 A1 Aug. 20, 2015

(30) Foreign Application Priority Data
Aug. 22, 2012 (ZA) ........................... 12/6310

(51) Int. Cl.
C22B 15/00 (2006.01)
C22B 1/16 (2006.01)
C22B 3/06 (2006.01)

(52) U.S. Cl.
CPC ............ C22B 15/0069 (2013.01); C22B 1/16 (2013.01); C22B 3/06 (2013.01); C22B 15/0008 (2013.01)

(58) Field of Classification Search
CPC .... C22B 1/00; C22B 1/16; C22B 3/06; C22B 3/08; C22B 3/10; C22B 15/0069; C22B 15/0071; C22B 15/0008
See application file for complete search history.

(56) References Cited

U.S. PATENT DOCUMENTS

| | | | |
|---|---|---|---|
| 2004/0144209 A1* | 7/2004 | Faine | C22B 1/243 75/743 |
| 2005/0169823 A1* | 8/2005 | Faine | C22B 15/0008 423/45 |
| 2007/0014709 A1* | 1/2007 | Moyes | C22B 3/10 423/22 |

(Continued)

FOREIGN PATENT DOCUMENTS

WO   WO 2012/001501   1/2012

OTHER PUBLICATIONS

PCT/IB2013/001810 International Search Report dated Jan. 7, 2014 (2 pages).

(Continued)

*Primary Examiner* — Roy King
*Assistant Examiner* — Tina M McGuthry Banks
(74) *Attorney, Agent, or Firm* — Brinks Gilson & Lione; G. Peter Nichols

(57) ABSTRACT

A process of extracting copper from copper sulphide minerals which is enhanced at solution potentials exceeding 700 mV SHE, in the absence of any microorganism, by contacting the minerals in a pre-treatment phase using an acid solution at a high chloride content containing dissolved copper.

31 Claims, 9 Drawing Sheets

(56) References Cited

U.S. PATENT DOCUMENTS

2011/0150729 A1* 6/2011 Liu .......................... C22B 3/42
423/139
2012/0308450 A1* 12/2012 Pereira .................... C22B 3/10
423/25

OTHER PUBLICATIONS

PCT/IB2013/001810 Written Opinion of the International Preliminary Examining Authority dated Aug. 18, 2014 (4 pages).
PCT/IB2013/001810 International Preliminary Report on Patentability dated Nov. 7, 2014 (4 pages).
Article, Herreros et al.; "Leaching of sulfide copper ore in a NaCl—H2SO4—O2 media with acid pre-treatment", Hydrometallurgy, Elsevier Scientific Publishing Cy, Amsterdam, NL, vol. 89, No. 3-4 Oct. 25, 2007 pp. 260-268, XP022314570; ISSN: 0304-386X, DOI: the whole document.

* cited by examiner

HEAP LEACHING METHOD

BACKGROUND OF THE INVENTION

This invention relates to generally to the leaching of a base metal.

The invention relates to a hydrometallurgical method for heap leaching of copper from principally sulphide minerals such as chalcocite, covellite, bornite and chalcopyrite, or a mixed sulphide with copper oxide mineral. These applications are however exemplary only and are non-limiting for the principles of the invention may be used for the recovery of base metals such as nickel from nickel sulphide minerals e.g. pentlandite and millerite, and for the recovery of zinc from zinc sulphide minerals. The invention is described hereinafter with reference to the use of a high chloride mediated, high solution potential, pre-treatment step for heap leaching of run-of-mine (ROM) or crushed ore.

An object of the invention is to increase the oxidation rate of sulphide minerals or mixed sulphide and oxide minerals during a pre-treatment step prior to active heap irrigation, and thereby provide improved metal recovery in a shorter leach cycle and, additionally, to address the operational cost of a heap leach by reducing aeration requirements.

SUMMARY OF THE INVENTION

The invention is primarily based on the surprising discovery that copper extraction from copper sulphide minerals may be enhanced at solution potentials exceeding 700 mV SHE, in the absence of any microorganism, by contacting the minerals in a pre-treatment phase using an acid solution at a high chloride content containing dissolved copper.

As used herein "a heap" includes a heap, a dump, a vat or a column which contains an ore which is to be processed.

The invention provides a method of recovering a base metal from an ore wherein the ore is subjected to a pre-treatment phase followed by an active leach cycle and wherein, in the pre-treatment phase:
1. the ore is contacted with a solution during an agglomeration step, or by irrigation;
2. the solution potential in contact with the ore exceeds 700 mV vs. Standard Hydrogen Electrode (SHE), in the absence of microorganisms;
3. the total iron concentration of the solution contacting the ore is >0.1 g/L;
4. the solution addition is controlled to achieve a final ore moisture content in the range 2 to 25 wt. %, preferably 5 to 8 wt. %;
5. the acidity is such that the pH of the solution contacting the ore does not exceed pH 3.0, and preferably is below pH 2.5;
6. the $Cl^-$ ion concentration of the solution contacting the ore is between 130 and 230 g/L; and
7. the dissolved oxygen level in the solution contacting the ore is below 1 mg/L.

A low dissolved oxygen level in the solution may be achieved by natural ventilation of the heap, or if required by applying a low aeration rate to the heap or to the irrigation solution The solution may contact the ore after the heap has been established. Alternatively or additionally the solution may contact the ore using an agglomeration technique, or by contacting the ore directly, while the heap is being established or after the heap has been established. The aforementioned step 1 is to be construed in this manner.

The method may include the step of providing an irrigation grid whereby the solution is applied to the heap. The irrigation grid may be located on a surface of the heap, or within the heap, or a combination of both locations may be employed. The irrigation grid may be used directly on an established heap, or in combination with an agglomeration technique.

The irrigation grid may be of any suitable kind and the invention is not limited in this respect. By way of example the irrigation grid may include a reticulated network of pipes, sprays and the like located on a surface of the heap, or within the heap, or both.

The method may include the steps of monitoring the moisture content in the heap and of controlling the addition of solution to the heap in response to the measured moisture content.

The rate at which solution is supplied to the heap during the pre-treatment process may be varied in response to the measurement. Alternatively, the supply of solution to the heap may be interrupted at intervals i.e. the solution is supplied in a batch mode to the heap. A combination of both techniques may however be employed.

The chloride ions may be introduced, within the pre-treatment process, by means of one or more of the following:
a) the addition of one or more of the following: NaCl, $MgCl_2$, KCl and $AlCl_3$, directly to the ore, preferably in the course of an agglomeration process;
b) the addition of one or more of the following: NaCl, $MgCl_2$, KCl and $AlCl_3$, directly to the solution. This may be done during the establishment of the moisture content of the ore; preferably this is during an agglomeration process. Use may be made of any suitable technique. For example salt may be drawn from a custom-built salt addition pond which is connected to an agglomerator mechanism e.g. a drum;
c) the addition of one or more of the following: NaCl, $MgCl_2$, KCl and $AlCl_3$, to a custom-designed salt addition pond. Chloride solution, drawn from the pond, can then be applied to the heap, during an agglomeration process, or after the heap has been established, for example by using an irrigation grid located on the surface of the heap or within the heap;
d) water which naturally contains salt, e.g. water drawn from the sea or from a salt lake or reservoir, can be applied to the ore during an agglomeration process or by using the aforementioned irrigation grid, or by the use of both techniques; and
e) brine, produced for example as a by-product during a desalination process, can be applied to the ore during an agglomeration process or via the aforementioned irrigation grid.

The pH level of the solution in contact with the ore may be maintained at pH 3.0, preferably less than pH 2.5, by the addition of sulphuric acid directly to the ore during an agglomeration process or by the addition of sulphuric acid to the solution which establishes the moisture level. As noted, the solution may be applied to the ore during an agglomeration process or by means of the irrigation grid or by using both techniques.

The pre-treatment phase may be carried out under ambient conditions i.e. at temperature and atmospheric pressure conditions prevailing at the heap.

It is possible to generate heat on surfaces of the ore particles during an agglomeration process, by contacting the ore with a solution which has the aforementioned high Cl ion concentration and to which concentrated sulphuric acid has been added. The amount of heat generated during the agglomeration process is caused by a reaction on the ore surface of the added sulphuric acid with the chloride and copper in solution. This is important for the heat generated raises the ore temperature significantly and the increased temperature contributes to faster mineral oxidation rates and, consequently, to an increase in metal recovery and to a reduction in leach cycle time.

When the method of the invention is employed for the recovery of copper the solution may have a copper to iron ratio >1.

The desired copper to iron ratio may be obtained by means of one or more of the following processes:
a) the addition of copper sulphate directly to the ore during an agglomeration process;
b) the addition of copper sulphate to the solution which establishes the moisture level. The solution may be added to the ore during an agglomeration process or via the aforementioned irrigation grid;
c) the addition of an electrolyte, containing copper, mixed with the solution which establishes the moisture level. This "combined" solution may be applied to the ore during an agglomeration process or by using the irrigation grid;
d) the addition of a leach solution, containing copper, drawn from any part of the leach circuit, directly to the ore during an agglomeration process or via an irrigation grid. The leach solution may be mixed with the solution used to establish the moisture level which, in turn, is applied to the ore during an agglomeration process or by using an irrigation grid; and
e) the dissolution of copper sulphide or copper oxide minerals.

Preferably the pH of the solution which is brought into contact with the ore during the pre-treatment phase is less than pH 2.5

The pre-treatment phase is preferably carried out for a period of less than 100 days. The duration of the pre-treatment period is determined by the time to complete mineral oxidation and is dependent, at least, on the method used to contact the ore with the solution i.e. by using an agglomeration technique, by direct solution contact with the ore, or by irrigation of the heap.

During the active leach cycle, which follows the pre-treatment phase, the ore in the heap may be irrigated with a leach solution. The subsequently-leached base metal, e.g. copper, may thereafter be recovered using any suitable process e.g. a solvent extraction process.

The leach solution used in the active leach cycle may contain sulphuric acid and have a pH of less than pH 2.5.

Optionally, hydrochloric acid may be added to the leach solution.

The leach solution may contain copper, iron and other anion and cation species that may originate from process water drawn from the heap, or which may have dissolved from the ore which is being treated.

The solvent extraction process may include at least one copper-loaded organic washing stage to promote an electrolyte chloride ion concentration which is below 50 ppm.

BRIEF DESCRIPTION OF THE DRAWINGS

The invention is further described by way of example with reference to the accompanying drawings in which.

DESCRIPTION OF PREFERRED EMBODIMENTS

The invention is described herein with reference to the use of a high chloride mediated, high solution potential, pre-treatment phase, prior to an active leach cycle, for crushed or run-of-mine (ROM) ore, heap leaching. The invention is based on the surprising discovery that, in respect of copper recovery, the conditions referred to herein enhance copper extraction from copper sulphide minerals and from copper sulphide/copper oxide minerals in a shorter leach cycle at solution potentials exceeding 700 mV SHE, in the absence of any sort of microorganism.

An object of the invention is to significantly increase the oxidation rate of sulphide minerals or mixed sulphide and oxide minerals during a pre-treatment step prior to active heap irrigation, and thereby improve metal recovery in a shorter leach cycle and, additionally, to lower, at least to some extent, the operational cost of a heap leach by reducing or eliminating the requirement of forced aeration during a pre-treatment step. This type of aeration is normally implemented through the use of blowers, compressors and similar devices. The reduction of aeration is possible since in the method of the invention the pre-treatment reaction proceeds at lower dissolved oxygen levels, and at a lower oxygen demand, compared to conventional heap leach practice. Consequently, forced aeration of the heap at the high aeration rates which are normally required to maintain solution oxidation potentials at 700 mV vs. SHE or greater, is not necessary.

The pre-treatment phase can be carried out, at least partly, using agglomeration techniques, while a heap is being constructed. Alternatively or additionally the pre-treatment phase can be implemented after the heap has been constructed. During the pre-treatment phase which may be from 1 to 200 days in duration but which is preferably less than 100 days in duration, and prior to active heap irrigation, the invention aims to achieve rapid oxidation of sulphide minerals or mixed sulphide and oxide minerals. The duration of the period of pre-treatment is determined by the time to complete mineral oxidation and is dependent, at least, on the method used to contact the ore with the solution e.g. by using an agglomeration technique, by direct solution contact with the ore, or by irrigation of the heap.

Figure 1:
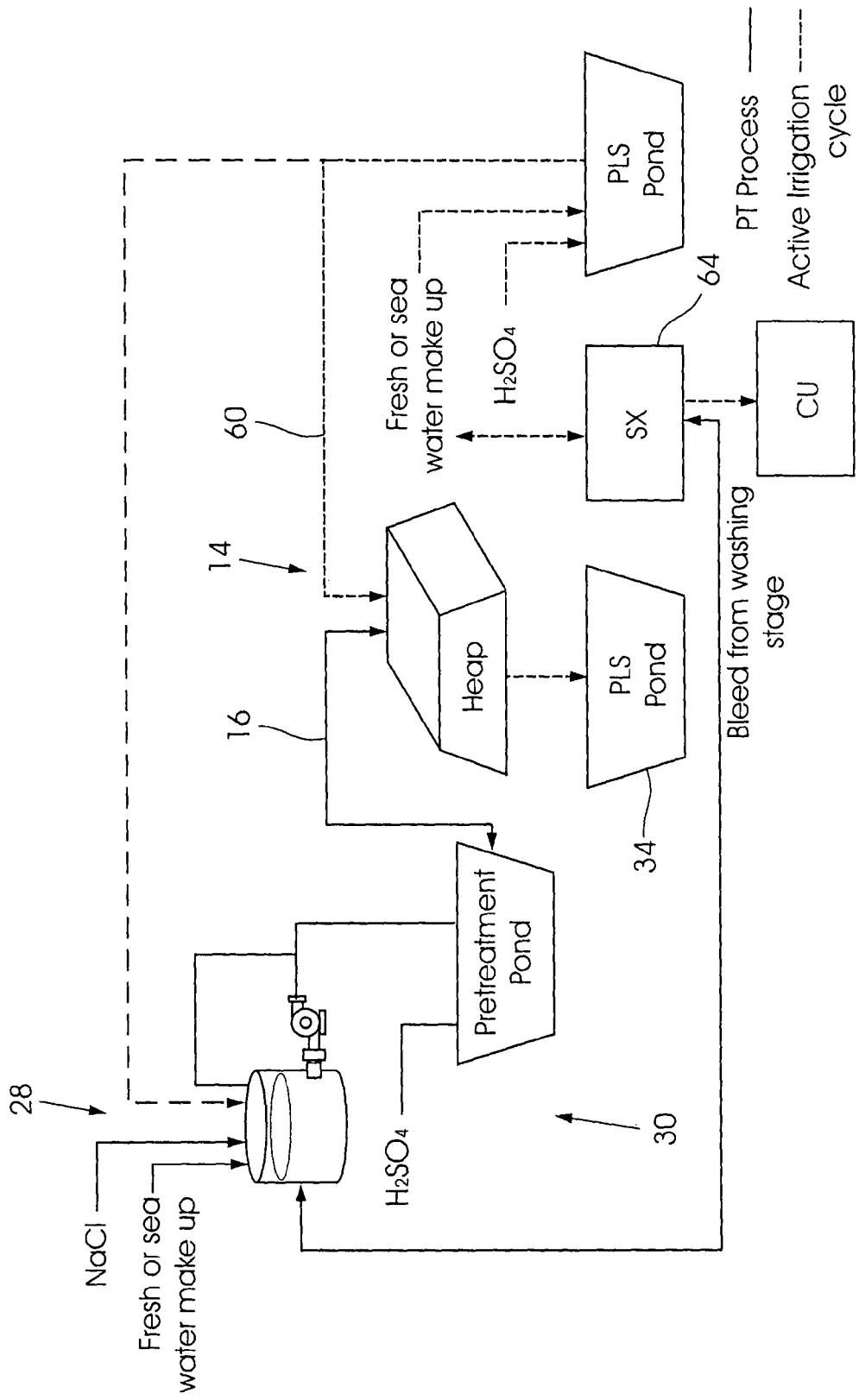
FIG. 1 illustrates in block diagram form aspects of a hydrometallurgical method for the heap leaching of copper.
Figure 2:
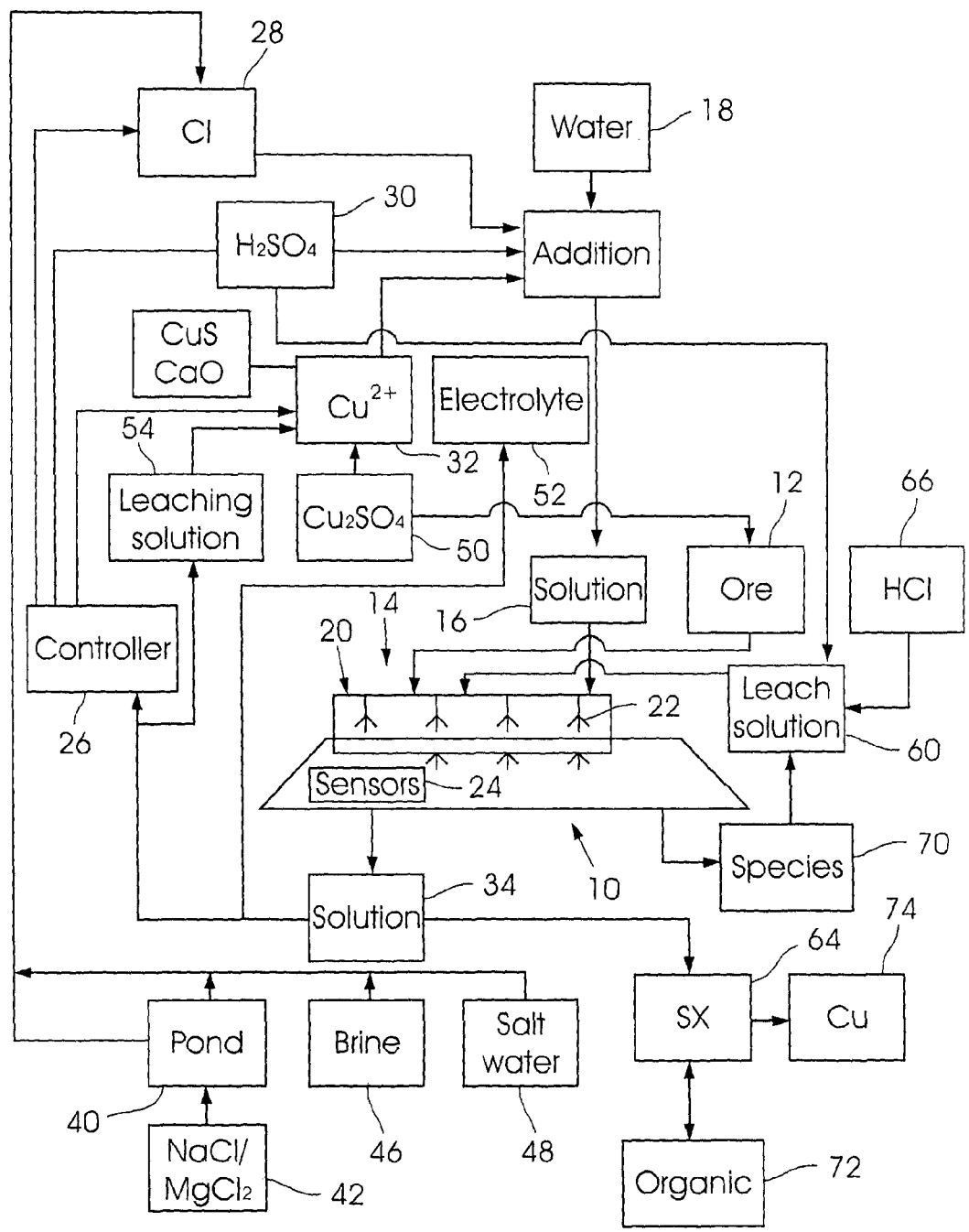
FIG. 2 illustrates in further detail a pre-treatment phase in the heap leaching process shown in FIG. 1, and aspects of a subsequent active leach cycle, for the recovery of copper.

FIG. 1 of the accompanying drawings illustrates a basic ROM heap leach flowchart for the process of the invention. FIG. 2 illustrates in further detail steps involved in a pre-treatment phase of the ore which is being leached, and aspects of a subsequent active leach cycle.

FIGS. 1 and 2 show a heap 10. It is to be understood that the heap can be constructed from ore 12 before the pre-treatment phase is carried out. Alternatively the pre-treatment phase is carried out, at least partly, using an agglomeration process while the heap is being constructed. Thus both techniques can be used. The pre-treatment phase can commence using agglomeration techniques and can then be continued after the heap has been constructed. The heap 10 is shown to be a conventional heap. This is illustrative only for the heap may in fact comprise an ore column, a dump, a vat or a similar collection of ore which contains a mineral to be recovered.

An irrigation network 14 is positioned to irrigate the heap with a solution 16 prepared with water drawn from a source 18. The irrigation network includes a reticulated system built from irrigation pipes 20 dispersed above and within the heap, and sprays or outlet nozzles 22 of any suitable kind. Moisture sensors 24 and related instruments are positioned on or in the heap, as appropriate, in order to obtain a measure of the moisture content of the ore in the heap.

The pre-treatment phase is implemented under the control of a control system 26. This system, in response to various parameters and variables, controls the addition of chloride ions 28, sulphuric acid 30 and copper-containing material 32, to the water 18 to produce the solution 16 with desired characteristics. The system is also responsive to characteristics of a solution 34 draining from the heap.

The ore 12 may, as noted, be placed in the heap using an agglomeration process i.e. the ore particles are treated with the solution 16 while the heap is being constructed. Alternatively the heap is constructed from the ore particles and thereafter the solution 16 is applied to the heap. Both approaches can however be used, in succession.

In the pre-treatment phase the solution 16 is used to irrigate the ore for a period of up to 200 days. The solution, which contacts the ore, complies with the following characteristics:
a) a solution potential that exceeds 700 mV SHE in the absence of microorganisms;
b) a copper to iron ratio greater than 1;
c) a total iron concentration above 0.1 g/L;
d) a pH of less than pH3.0—preferably the pH is lower than pH2.5;
e) a chloride ion concentration of between 130 g/L and 230 g/L;
f) a dissolved oxygen content of less than 1 mg/L.

The solution is applied to the heap to achieve an ore moisture content of between 2 wt. % and 25 wt. %. Preferably the ore moisture content lies in the range of from 5 wt. % to 8 wt. %.

The system 26, using information from the sensors 24, and information relating to the characteristics of the drainage solution 34 (derived using suitable monitoring methods and sensors), monitors the moisture content in the ore and controls the addition of water to the solution and hence to the irrigation network 14. The rate at which the solution is applied to the heap may be varied. Alternatively the solution may be applied to the heap in a "batch" mode i.e. application of the solution to the heap during one period is followed by a period in which no solution is applied to the heap, and so on.

The chloride ions (block 28) are introduced into the solution 16 using at least one of the following:
a) the addition of one or more of the following: NaCl, MgCl$_2$, KCl and AlCl$_3$:
  1. directly to the ore 12 during an agglomeration process; or
  2. directly to the solution 16 during an agglomeration process by drawing salt from a salt addition pond 40, designed for the purpose; or
b) the addition of one or more of the following: NaCl, MgCl$_2$, KCl and AlCl$_3$, (42) to a solution held in a specially designed salt addition pond (40) and by applying solution drawn from the pond to the heap 10 via the irrigation network 14; or
c) brine 46 which is produced during a desalination process can be added to the ore 12 during an agglomeration process or via the irrigation network 14; or
d) water 48 which naturally contains salt e.g. sea water, salt lakes or reservoir water, can be used as a chloride ion source applied to the ore 12 during an agglomeration process or by use of the irrigation network 14.

The sulphuric acid (block 30) may be added directly to the ore during a process of agglomeration or may be added to the solution 16 which in turn is applied to the ore 12 during an agglomeration phase or via the irrigation network 14.

In order to achieve the desired copper to iron ratio, which should prevail during the pre-treatment phase, various techniques may be employed. These include one or more of the following:
a) the addition of copper sulphate 50 directly to the ore 12 during an agglomeration process, or to the solution 16 which in turn is used during an agglomeration process or which is applied to the ore via the irrigation network 14;
b) the addition of an electrolyte 52 which contains copper ore which is mixed with the solution 16;
c) the addition of a leach solution 54, containing copper, which is drawn from any part of the leach circuit; and
d) the dissolution of copper sulphide and/or copper oxide minerals into the solution 16.

During the pre-treatment phase, with the establishment of a solution potential exceeding 700 mV SHE, oxidation of secondary covellite (a product of first step chalcocite oxidation), and of native covellite, by ferric iron, is enhanced:
a) first stage chalcocite leaching is initiated by the oxidation with some ferric iron in the solution contacting the ore. This reaction proceeds at a solution potential exceeding 500 mV SHE;

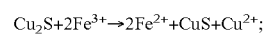
$$Cu_2S + 2Fe^{3+} \rightarrow 2Fe^{2+} + CuS + Cu^{2+};$$

b) under the aforementioned conditions, ferrous iron is oxidised by cupric copper to solution potential values exceeding 700 mV according to the following equilibrium reaction:

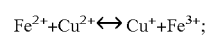
$$Fe^{2+} + Cu^{2+} \leftrightarrow Cu^+ + Fe^{3+};$$

c) cuprous is more effective than ferrous iron in utilising dissolved oxygen, stipulated as being below 1 mg/L, and is oxidised according to the following reaction:

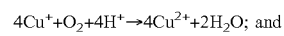
$$4Cu^+ + O_2 + 4H^+ \rightarrow 4Cu^{2+} + 2H_2O; \text{ and}$$

d) oxidation of secondary and/or primary covellite is enhanced, at stipulated solution potentials exceeding 700 mV SHE, thereby contributing to the extent of copper extraction from secondary sulphides:

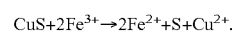
$$CuS + 2Fe^{3+} \rightarrow 2Fe^{2+} + S + Cu^{2+}.$$

FIG. 2 also illustrates aspects of an active leach cycle which follows the pre-treatment phase.

During the active leach cycle the ore in the heap is irrigated with a leach solution 60. Copper leached from the heap is recovered from the draining solution 34 via a solvent extraction process 64. The leach solution 60 has a pH less than pH 2.5, achieved, as appropriate, by the addition of sulphuric acid 30. Optionally, the leach solution includes hydrochloric acid 66. The leach solution may also contain copper, iron and other anion and cation species 70 originating from processed water employed in the leaching cycle or dissolved from the ore which is being treated.

During the solvent extraction process 64 use may be made of one or more copper-loaded, organic washing stages 72 to promote an electrolyte chloride ion concentration below 50 ppm. The recovered copper is designated 74.

FIGS. 3 to 15 illustrate graphically certain aspects of the method of the invention and benefits which accrue from its use.

Figure 3:
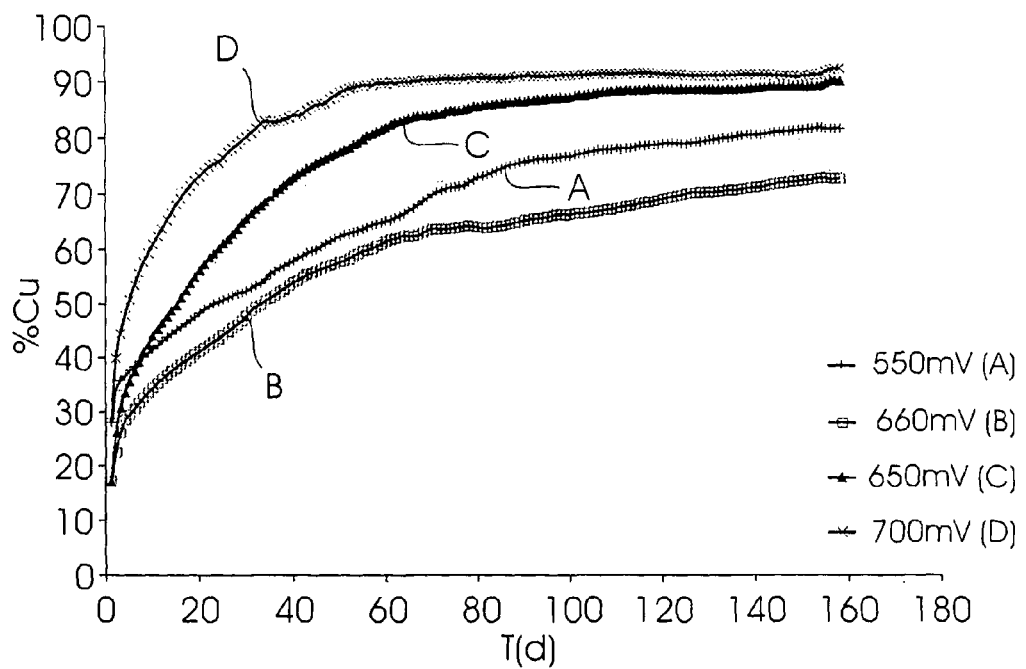
FIGS. 3 to 16 are graphical depictions of different characteristics related to the heap leaching method of the invention.

FIG. 3 shows curves of the extraction of copper on a percentage basis versus time in days from whole ore containing secondary copper sulphide as a function of solution potential at 550 mV, 600 mV, 650 mV and 700 mV, respectively at ambient conditions. It is apparent that copper recovery rate is enhanced at 700 mV.

Figure 4:
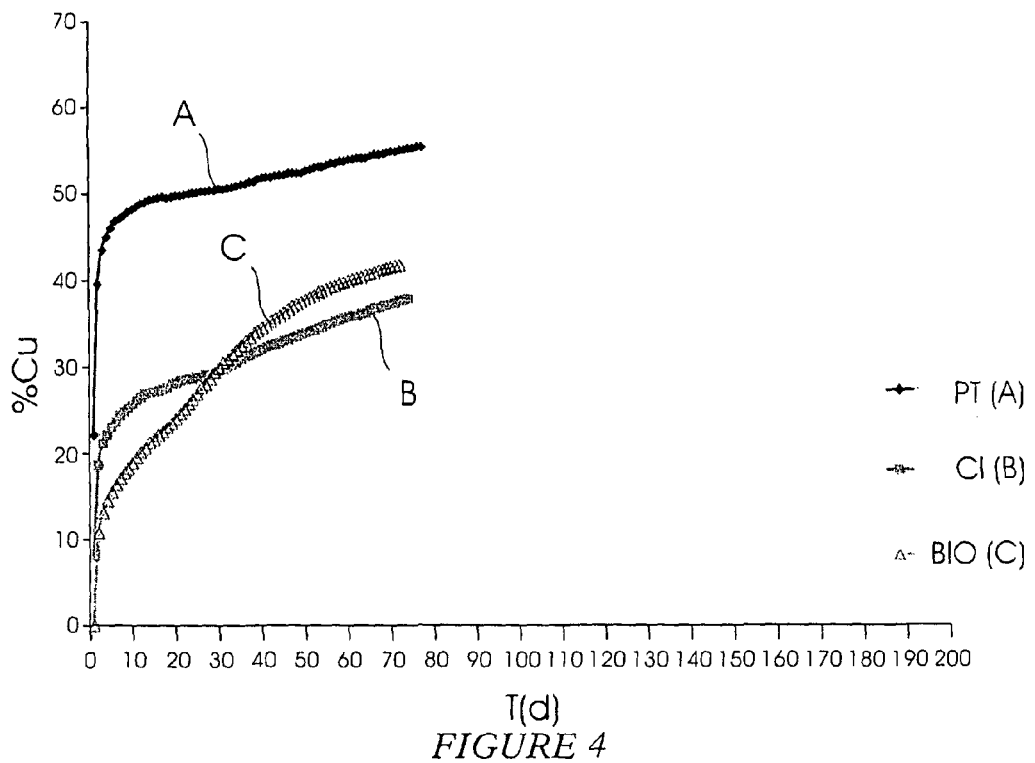

FIG. 4 illustrates, on a comparative basis, percentage copper recovery rates at ambient conditions, from whole ore containing secondary copper sulphide using the pre-treatment step of the invention (A) compared to the use of a chemical leach at a chloride ion concentration below 130 g/L (B) and a conventional bioleach using microorganisms (C).

Figure 5:
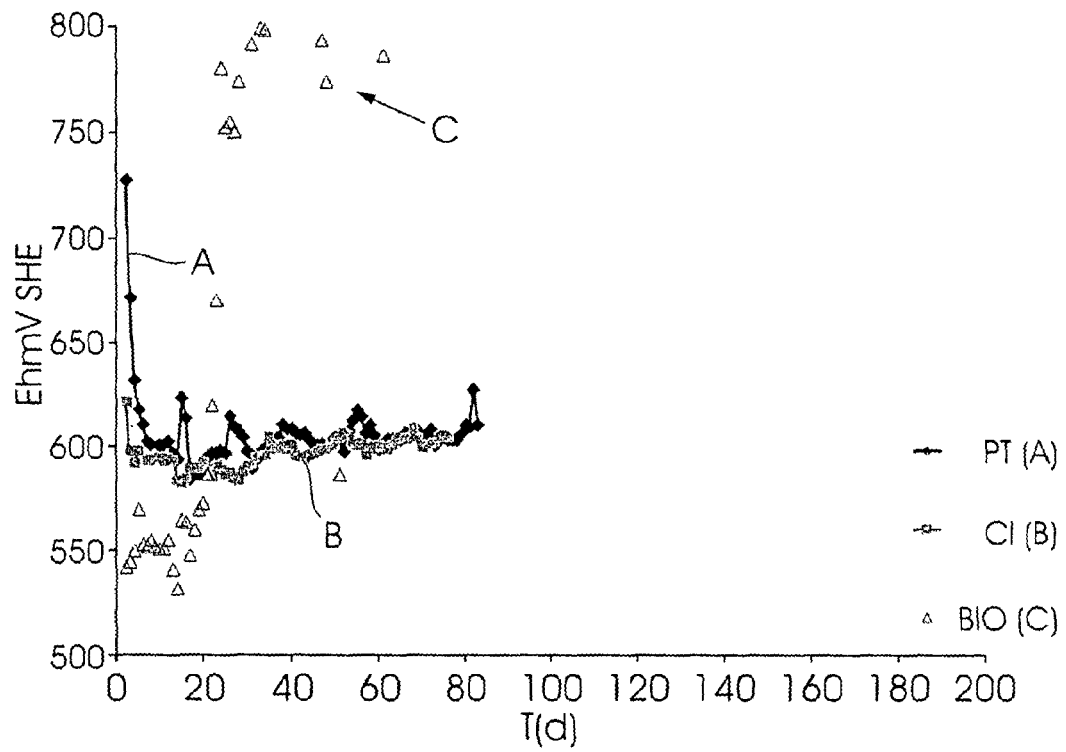

FIG. 5 shows the solution potential of the pregnant leach solutions from the systems referred to in connection with FIG. 4. After the pre-treatment process the solution potential exceeded 700 mV (SHE). The chloride iron concentration at this stage was 180 g/L.

Figure 6:
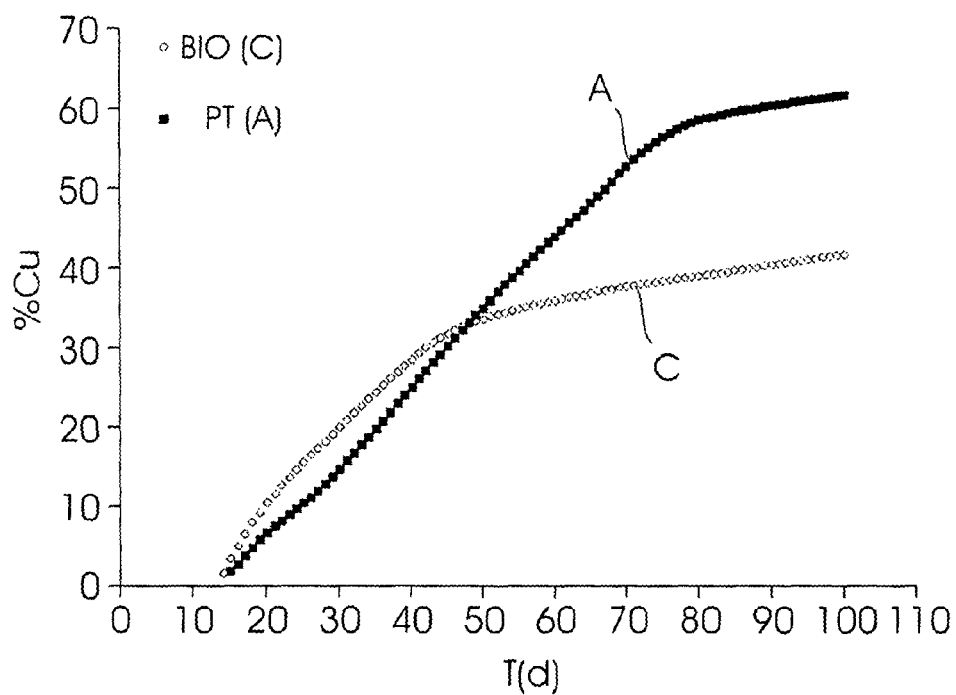

FIG. 6 is a graphical comparison showing an enhanced rate of copper extraction at ambient conditions from whole ore containing secondary copper sulphide during the pre-treatment step of the invention, compared to that achieved using a bioleaching process. The tests were done in 10*m* high column leach systems with only natural air diffusion into the ore bed. There was no forced aeration.

Figure 7:
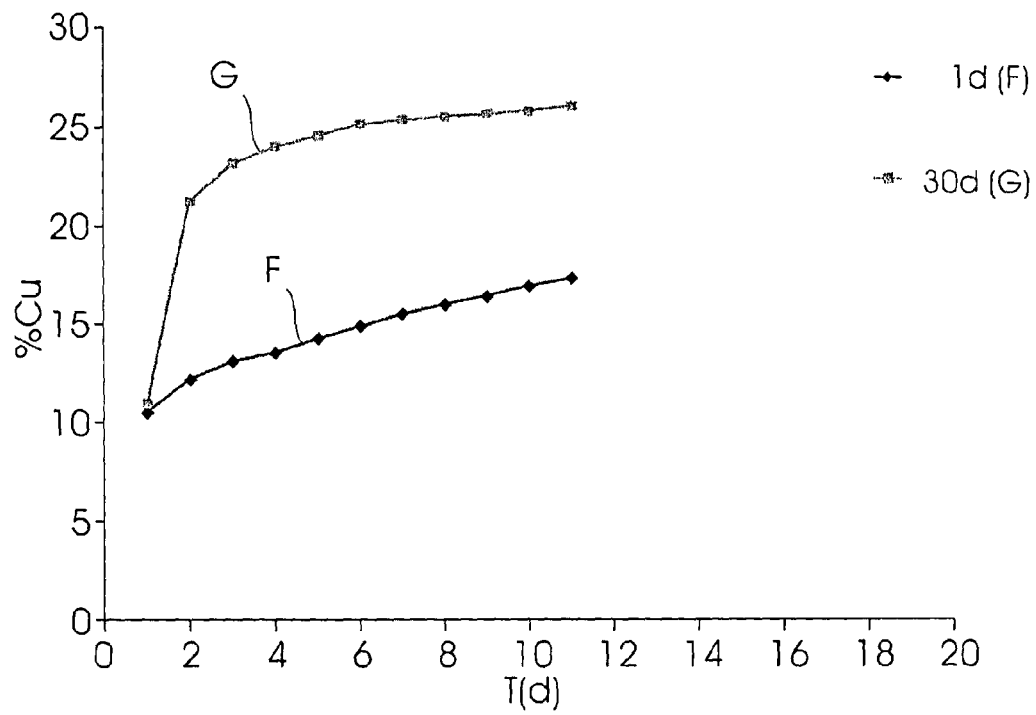

FIG. 7 depicts the difference in copper extraction from whole ore containing secondary copper sulphides after one day of pre-treatment, (curve F) and after 30 days of pre-treatment (curve G), according to the invention, respectively.

Figure 8:
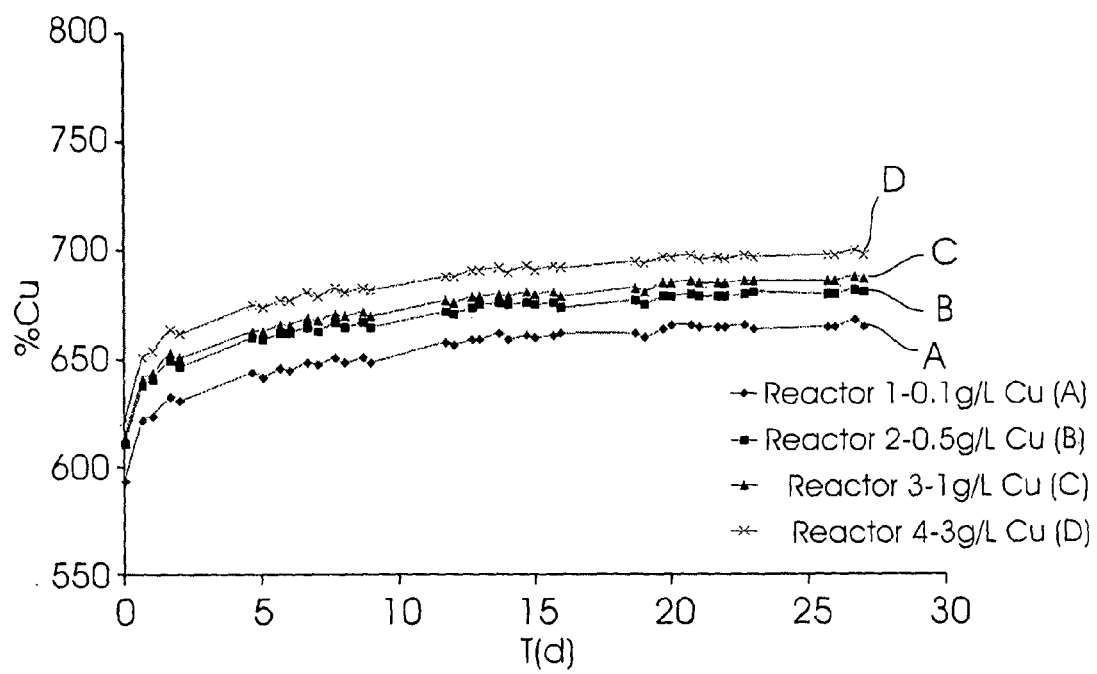
Figure 9:
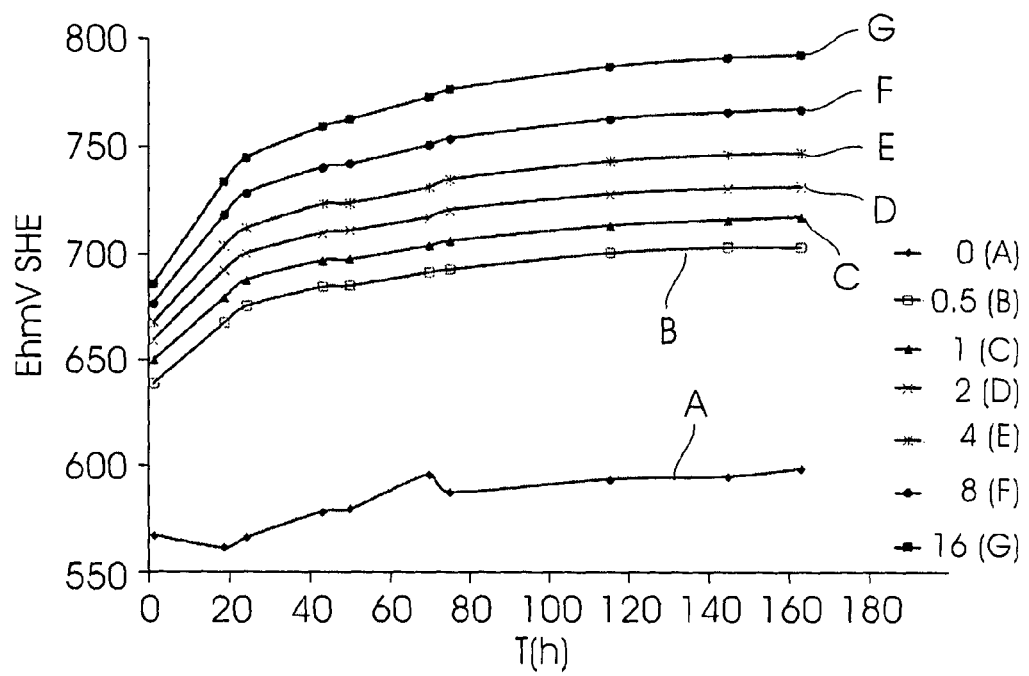

Tests were conducted in batch reactors at 25° C. containing various concentrations of copper (as shown in FIG. 8), 1 g/L starting ferrous iron, 80 g/L chloride ions and 4 g/L sulphuric acid. Solution potentials were measured over time. These conditions represent potentials that can be expected during the greater part of an active heap irrigation cycle. A pseudo-equilibrium condition pertains at a solution potential below 700 mV SHE.

Solutions potentials were measured over time in hours in batch reactors with natural air diffusion into an ore bed i.e. there was no forced aeration. This was at 25° C. The reactors contained various concentrations of copper, indicated in FIG. 9, 1 g/L starting ferrous iron, 180 g/L chloride ions and 1 g/L sulphuric acid. These conditions are not easily reproducible during an active heap irrigation cycle but are readily obtained by using the "lower moisture resting" pre-treatment step, of the present invention, prior to active irrigation. With a copper to iron ratio greater than 1, solution potentials of more than 700 mV were obtained.

Figure 10:
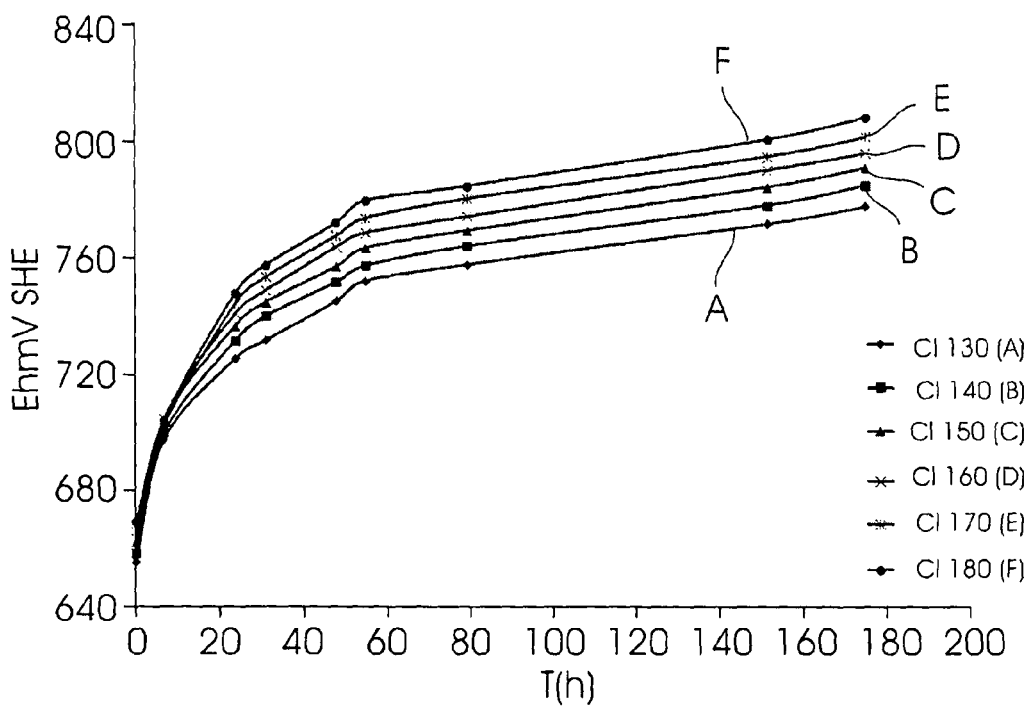

FIG. 10 shows solution potentials measured over time in batch reactors, with natural aeration only, at 25° C. for various concentrations of chloride ions (as identified in FIG. 10) ranging from 130 to 180 g/L, 1 g/L starting ferrous iron, 16 g/L copper ions and 1 g/L sulphuric acid. A pseudo-equilibrium condition prevailed above 700 mV, under chloride concentrations referred to herein.

Figure 11:
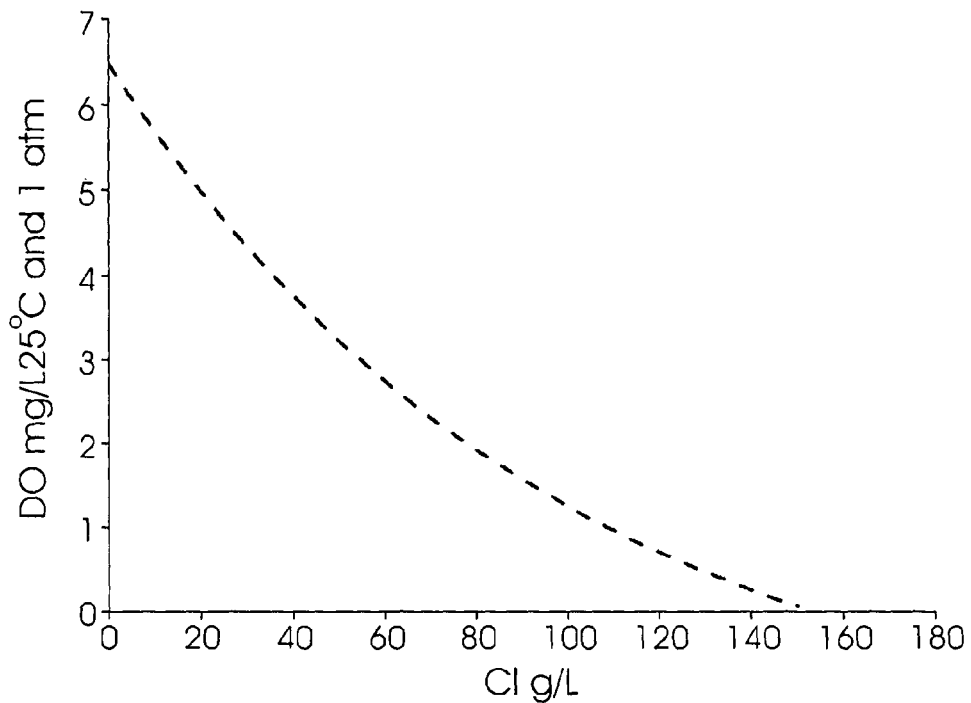

FIG. 11 shows the dissolved oxygen measured and extrapolated as a function of chloride concentrations in commercial plant steady state mature leach solution at atmospheric system pressure. The dissolved oxygen concentration was below 1 mg/L at chloride concentrations exceeding 100 g/L chloride ions.

Figure 12:
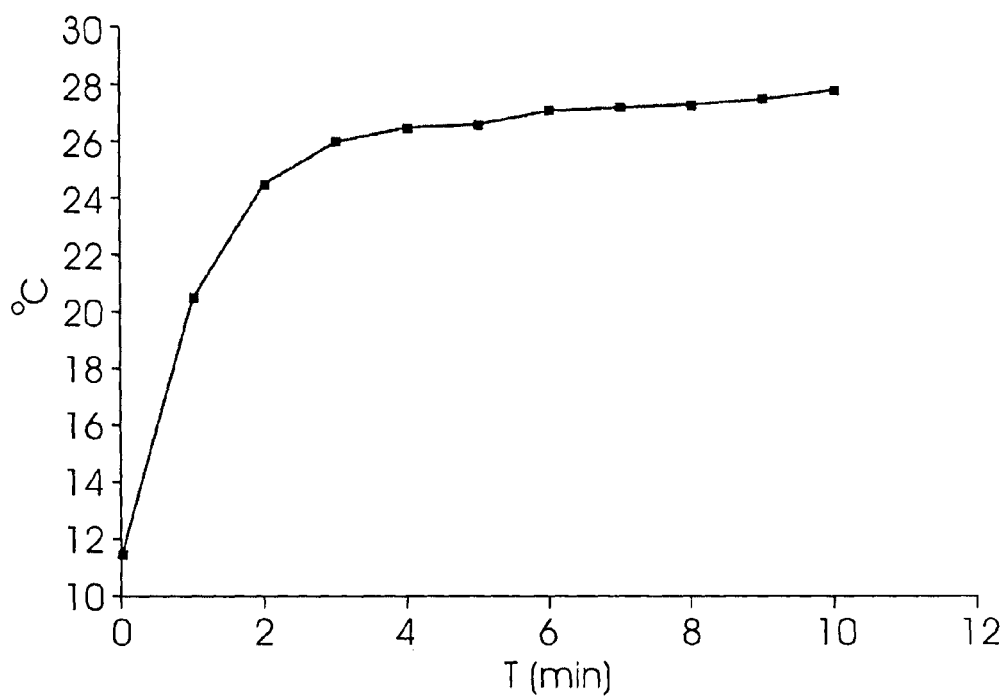

FIG. 12 is a curve of ore temperature vs time in minutes after agglomeration with concentrated sulphuric acid and a solution containing 4 g/L sulphuric acid, 1 g/L iron, 5 g/L copper and 180 g/L chloride ions.

Figure 13:
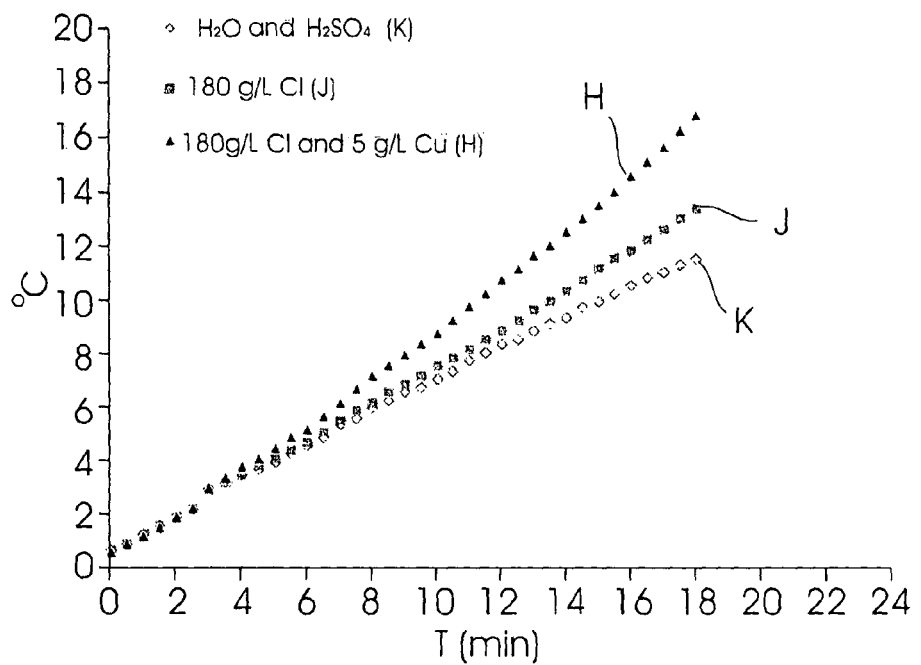

FIG. 13 is included for comparative purposes and illustrates a rise in temperature, above ambient temperature, of a cast metallic block which is contacted with concentrated sulphuric acid mixed with water (H), acidic water containing 180 g/L chloride ions (J), and acidic water containing 180 g/L chloride ions and 5 g/L copper ions (K).

Figure 14:
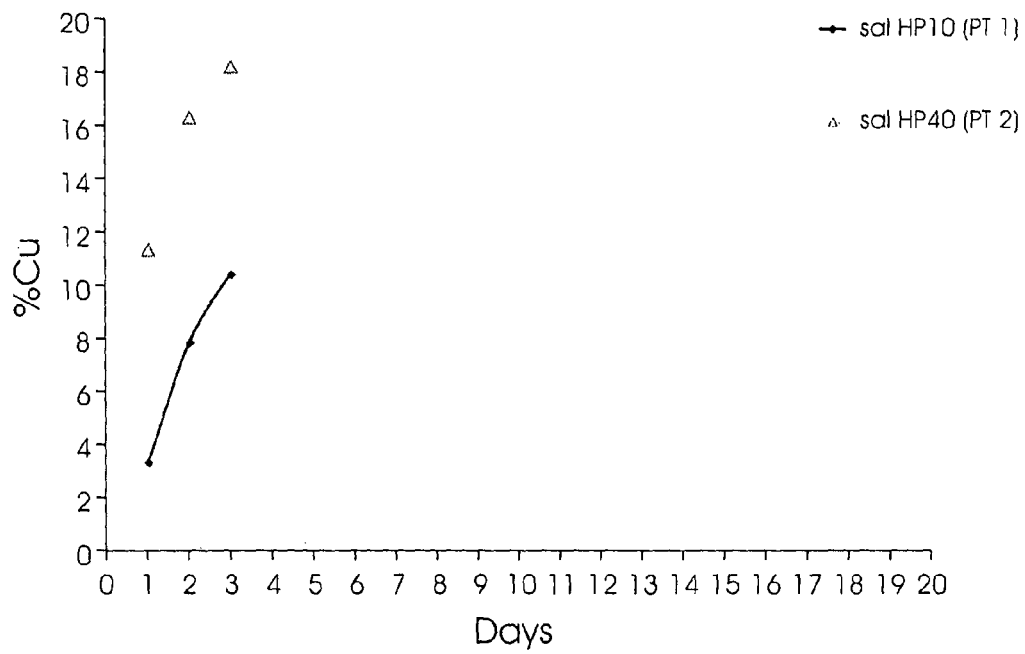

FIG. 14 shows the difference in copper extraction achieved at ambient conditions from whole ore containing secondary copper sulphide, at two different sulphuric acid concentrations, within the pre-treatment phase.

Figure 15:
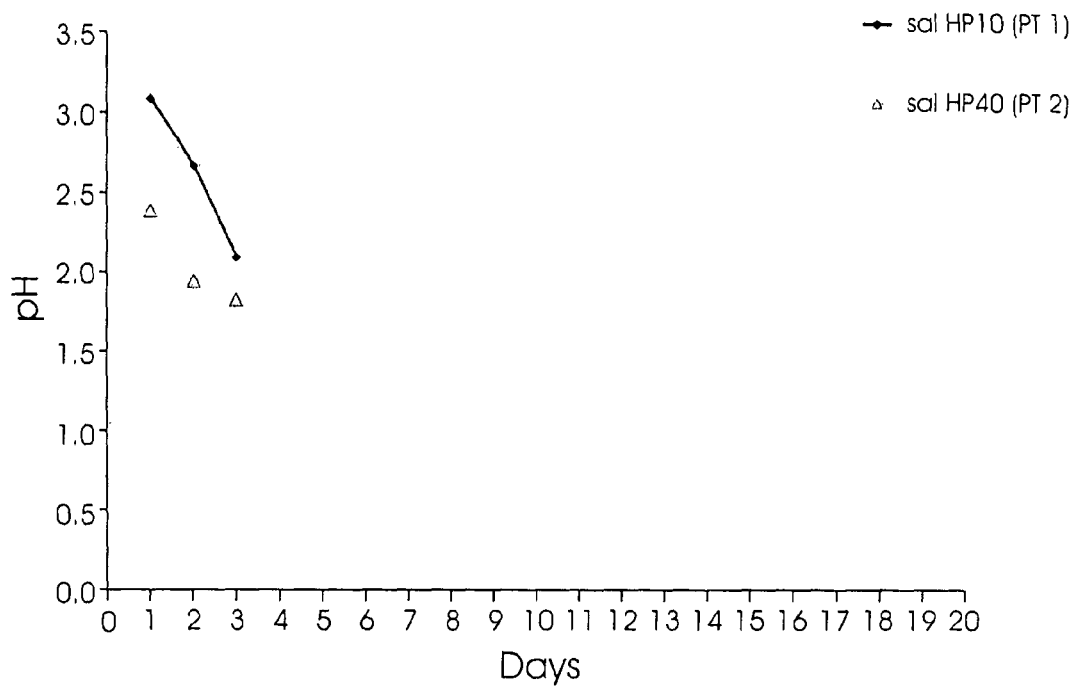

FIG. 15 is related to FIG. 14 and shows the pregnant leach solution pH of the copper extraction values as depicted in FIG. 14.

Figure 16:
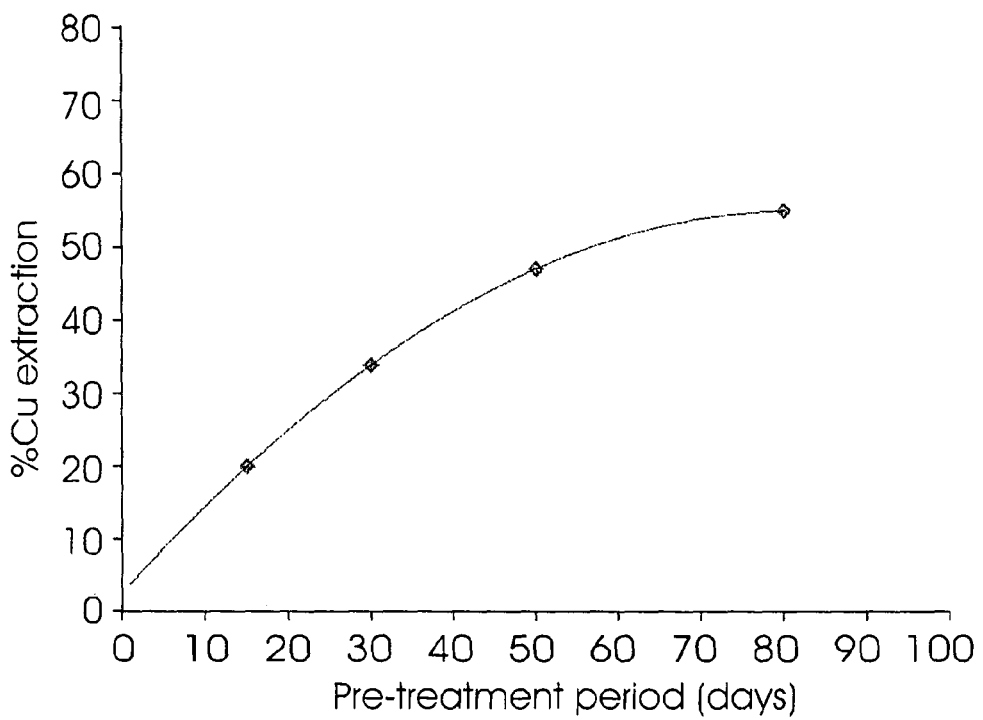

FIG. 16 shows the copper extracted from whole ore containing copper sulphide as a function of an increased pre-treatment period, stipulated herein as less than 100 days.

The invention claimed is:

1. A method of recovering a base metal from a crushed or run-of-mine (ROM) ore comprising:
   constructing the ore in a heap;
   subjecting the ore to a pre-treatment phase, under ambient conditions, wherein the pre-treatment phase comprises a step of contacting the ore with a solution by irrigating the heap with the solution to achieve a final ore moisture content in a range about 2 to about 25 wt. %; and wherein the solution contacting the ore is characterized by the following a potential that exceeds 700 mV vs Standard Hydrogen Electrode (SHE), in the absence of microorganisms; a total iron concentration greater than about 0.1 g/L; a pH that does not exceed pH 3.0; a $Cl^-$ ion concentration between 130 and 230 g/L; and a dissolved oxygen level below 1 mg/L; thereafter,
   leaching the pre-treated ore in an active leach cycle.

2. The method according to claim 1 further comprising agglomerating the ore and contacting the ore with the solution during the agglomeration.

3. The method according to claim 2 wherein the pH level of the solution in contact with the ore is maintained by adding sulphuric acid directly to the ore during the agglomeration.

4. The method according to claim 2 further comprising generating heat on surfaces of the ore particles during the agglomeration by contacting the ore with a solution that has the $Cl^-$ ion concentration and to which concentrated sulphuric acid has been added.

5. The method according to claim 2 wherein the solution has a copper to iron ratio of 1 which is obtained by adding copper sulphate directly to the ore during the agglomeration.

6. The method according to claim 1 wherein the final ore moisture content is in the range of about 5 to about 8 wt %.

7. The method according to claim 1 wherein the pH of the solution is below pH 2.5.

8. The method according to claim 1 wherein chloride ions are introduced directly to the ore by at least one of adding NaCl to the ore; adding $MgCl_2$ to the ore; adding KCl to the ore; adding $AlCl_3$ to the ore; adding salt water to the ore or adding brine to the ore.

9. The method according to claim 1 wherein chloride ions are introduced to the solution by least one of adding NaCl to the solution; adding $MgCl_2$ to the solution; adding KCl to the solution; adding $AlCl_3$ to the solution; adding salt water to the solution, or adding brine to the solution.

10. The method according to claim 1 further comprising:
introducing chloride ions to a pond to form the solution by at least one of adding NaCl to the pond; adding $MgCl_2$ to the pond; adding KCl to the pond; adding $AlCl_3$ to the pond; adding salt water to the pond, or adding brine to the pond; and
then drawing the solution from the pond.

11. The method according to claim 1 wherein the pH level of the solution in contact with the ore is maintained by adding sulphuric acid to the solution.

12. The method according to claim 1 wherein the solution has a copper to iron ratio >1, which is obtained by at least one step selected from the following processes:
(a) adding copper sulphate to the solution;
(b) adding an electrolyte, containing copper, mixed with the solution;
(c) adding a leach solution, containing copper, directly to the ore; or
(d) adding copper sulphide or copper oxide minerals.

13. The method according to claim 1 further comprising actively leaching the ore, by irrigating with a leach solution which contains sulphuric acid and which has a pH<2.5.

14. A method of recovering a base metal from a crushed or run-of-mine (ROM) ore comprising:
introducing chloride ions to a pond to form a solution by at least one of adding NaCl to the pond; adding $MgCl_2$ to the pond; adding KCl to the pond; adding $AlCl_3$ to the pond; adding salt water to the pond, or adding brine to the pond;
drawing the solution from the pond;
subjecting the ore to a pre-treatment phase, under ambient conditions, wherein the pre-treatment phase comprises a step of contacting the ore with the solution to achieve a final ore moisture content in a range about 2 to about 25 wt. %; and wherein the solution contacting the ore is characterized by the following a potential that exceeds 700 mV vs Standard Hydrogen Electrode (SHE), in the absence of microorganisms; a total iron concentration greater than about 0.1 g/L; a pH that does not exceed pH 3.0; a $Cl^-$ ion concentration between 130 and 230 g/L; and a dissolved oxygen level below 1 mg/L; thereafter,
leaching the pre-treated ore in an active leach cycle.

15. The method according to claim 14 further comprising agglomerating the ore and contacting the ore with the solution during the agglomeration.

16. The method according to claim 15 wherein the pH level of the solution in contact with the ore is maintained by adding sulphuric acid directly to the ore during the agglomeration.

17. The method according to claim 15 further comprising generating heat on surfaces of the ore particles during the agglomeration by contacting the ore with a solution that has the $Cl^-$ ion concentration and to which concentrated sulphuric acid has been added.

18. The method according to claim 14 wherein the final ore moisture content is in the range of 5 to 8 wt %.

19. The method according to claim 14 wherein the pH of the solution is below pH 2.5.

20. The method according to claim 14 wherein the pH level of the solution in contact with the ore is maintained by adding sulphuric acid to the solution.

21. The method according to claim 14 wherein the solution has a copper to iron ratio >1, which is obtained by at least one step selected from the following processes:
(a) adding copper sulphate to the solution;
(b) adding an electrolyte, containing copper, mixed with the solution;
(c) adding a leach solution, containing copper, directly to the ore; or
(d) adding copper sulphide or copper oxide minerals.

22. The method according to claim 14 further comprising actively leaching the ore, by irrigating with a leach solution which contains sulphuric acid and which has a pH<2.5.

23. A method of recovering a base metal from a crushed or run-of-mine (ROM) ore comprising:
subjecting the ore to a pre-treatment phase, under ambient conditions, wherein the pre-treatment phase comprises:
agglomerating the ore and contacting the ore with a solution during the agglomeration:
constructing the agglomerated ore in a heap and contacting the ore in the heap with the solution by irrigating the heap with the solution to achieve a final ore moisture content in a range about 2 to about 25 wt. %; wherein the solution contacting the ore is characterized by the following a potential that exceeds 700 mV vs Standard Hydrogen Electrode (SHE), in the absence of microorganisms; a total iron concentration greater than about 0.1 g/L; a pH that does not exceed pH 3.0; a $Cl^-$ ion concentration between 130 and 230 g/L; and a dissolved oxygen level below 1 mg/L, wherein the solution has a copper to iron ratio of 1 which is obtained by adding copper sulphate directly to the ore during the agglomeration; thereafter,
leaching the pre-treated ore in an active leach cycle.

24. The method according to claim 23 wherein the final ore moisture content is in the range of 5 to 8 wt %.

25. The method according to claim 23 wherein the pH of the solution is below pH 2.5.

26. The method according to claim 23 wherein chloride ions are introduced directly to the ore by at least one of adding NaCl to the ore; adding $MgCl_2$ to the ore; adding KCl to the ore; adding $AlCl_3$ to the ore; adding salt water to the ore or adding brine to the ore.

27. The method according to claim 23 wherein chloride ions are introduced to the solution by least one of adding NaCl to the solution; adding $MgCl_2$ to the solution; adding KCl to the solution; adding $AlCl_3$ to the solution; adding salt water to the solution, or adding brine to the solution.

28. The method according to claim 23 further comprising introducing chloride ions to a pond to form the solution by at least one of adding NaCl to the pond; adding $MgCl_2$ to the pond; adding KCl to the pond; adding $AlCl_3$ to the pond; adding salt water to the pond, or adding brine to the pond; and then drawing the solution from the pond.

29. The method according to claim 23 wherein the pH level of the solution in contact with the ore is maintained by adding sulphuric acid directly to the ore during the agglomeration.

30. The method according to claim 23 wherein the pH level of the solution in contact with the ore is maintained by adding sulphuric acid to the solution.

31. The method according to claim 23 further comprising generating heat on surfaces of the ore particles during the agglomeration by contacting the ore with a solution that has the $Cl^-$ ion concentration and to which concentrated sulphuric acid has been added.

* * * * *